Sept. 2, 1924.
G. W. SHEELEY
VALVE FOR AIR TUBES
Filed Aug. 9, 1922
1,507,437
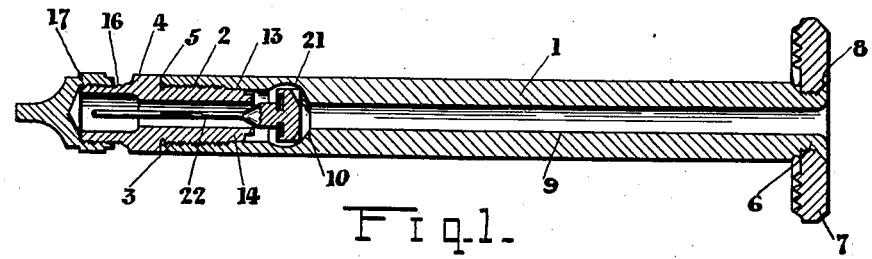
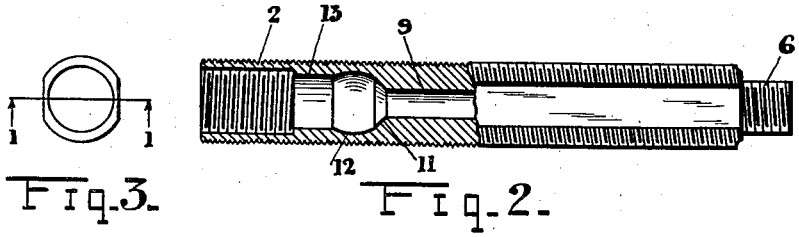
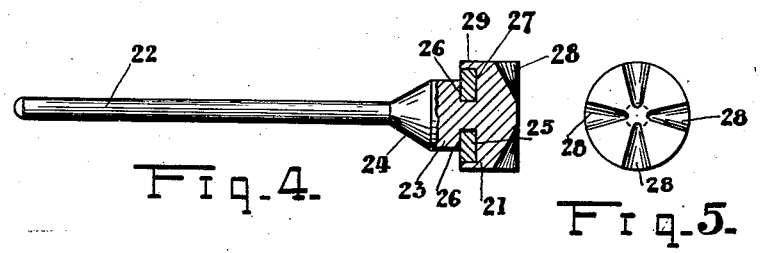
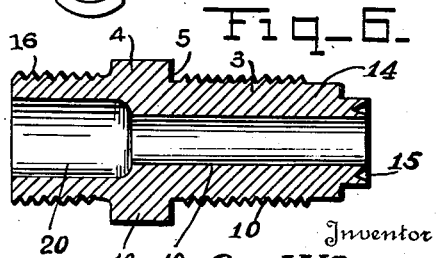
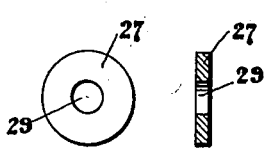
Inventor
Geo. W. Sheeley.
Attorney Patented Sept. 2, 1924.

1,507,437

UNITED STATES PATENT OFFICE.

GEORGE W. SHEELEY, OF FREDERICK, MARYLAND.

VALVE FOR AIR TUBES.

Application filed August 9, 1922. Serial No. 580,715.

*To all whom it may concern:*

Be it known that I, GEORGE W. SHEELEY, whose residence is Frederick, Maryland, and a citizen of the United States, have invented certain new and useful Improvements in Valves for Air Tubes, of which the following is a specification, reference being had to the accompanying drawings, forming a part thereof.
My invention relates to valve for air tubes, and is particularly intended for use in connection with the air tubes of pneumatic tires for automobiles and the like, and has for its object to provide a device of this class which will be simple and inexpensive to construct, which will permit free entrance of air under pressure to inflate the tire and will close instantly and postively when the ingoing pressure is relieved or is reduced so that the outward or back pressure exceeds it. A further object of the invention is to provide a device of this class in which all operations necessary to the interior construction of the valve tube may be effected from the outer end. A further object of the invention is to provide a device of this class in which the use of springs is dispensed with and in which the valve gasket is protected against diplacement by the air pressure.

With the objects above indicated, and other objects hereinafter described in view my invention consists in the construction and combination of elements hereinafter described and claimed.

Referring to the drawings:
Figure 1 is a longitudinal central sectional view on line 1—1 of Figure 3 of a complete air valve embodying my invention.
Figure 2 is a side view partly in section of the tube of the air valve.
Figure 3 is an end view of the tube shown in Fig. 2.
Figure 4 is a detail view of the valve on an enlarged scale.
Figure 5 is a bottom end view of the valve shown in Figure 4.
Figure 6 is a longitudinal central sectional view of the end plug carrying the valve seat.
Figure 7 is an end view of the end plug.
Figure 8 is a side view of the gasket.
Figure 9 is a vertical central sectional view of the gasket.
In the drawings 1 indicates the air inlet tube of the inner tube of a pneumatic tire having its bore enlarged at its outer end and screw threaded as shown at 2, to receive the screw threaded portion 3 of a hollow plug 4. This hollow plug 4 has a shoulder 5 at the end of the screw threaded portion 3 and when in place in the tube 1 this shoulder 5 fits against and makes a tight joint with the outer end of the tube.

The tube 1 is provided with a reduced portion 6 at its inner end which is screw threaded to receive a corrugated disk 7 which, in use bears against the interior of the inner tube of the tire. The corrugated disk after being screwed onto the reduced portion 6 is permanently secured in place by peening or spinning the end of the tube into an annular recess 8 in the disk.

The bore 9 of the tube is of relatively small diameter from its inner end to a point 10 towards its outer end. At this point a conical enlargement 11 is formed and continuous with this a spherical enlargement 12 is formed and from the outer end of this enlargement extends a cylindrical bore 13 of greater diameter than the bore 9 but of less diameter than the greater diameter of the spherical enlargement 12.

The hollow plug 4 has at the inner end of its screw threaded portion 3 a cylindrical portion 14 which fits within the cylindrical bore 13 and is provided at its end with a valve seat 15 formed by a V shaped annular groove in its end. The outer end of the hollow plug is extremely screw threaded at 16 to receive the usual dust cap 17.

From the inner end of the plug to a point 18 extends a bore 19 of relatively small diameter. From the point 18 to the outer end the bore is of relatively larger diameter as shown at 20.

Within the outer end of the end of the tube 1 is arranged a valve 21 carried by a valve stem 22 which extends outward through the bores 19 and 20 of the end plug 4. The main portion of this valve consists of a disk of such diameter as to fit closely within the cylindrical bore 13 of the tube 1. On its outer face this valve is provided with a cylindrical reduced portion 23 adapted to fit the bore 19 of the end plug 2 and this cylindrical reduced portion 23 tapers at its outer end to the diameter of the valve rod 22 as shown at 24.

In the outer face of the disk 21 is formed an annular recess 25, between the outer face of the disk and the inner end of the cylindrical reduced portion 23 the inner diameter of this annular recess being of less diameter than the diameter of the portion 23 so that a retaining shoulder 26 is formed at the base of this portion 23.

In the annular recess 25 is received and retained a gasket or washer 27 consisting of a disk of relatively soft elastic material having a central opening 28 of such diameter as to readily fit over the valve stem 22 the material of the washer being sufficiently elastic to permit the washer to be forced over the taper 24 and into the recess 25 without breaking.

In the inner face of the disk 21 are formed a series of radial grooves 28 tapering in depth from the center of the disk to its periphery.

When the valve stem is pushed inward to permit the air to escape from the inner tube the cylindrical portion 23 of the valve is forced out of the cylindrical portion 19 of the end plug and the gasket 27 is forced away from the valve seat 15, the main disk portion of the valve is forced inward into the spherical enlargement 12 so that an annular space is left between the periphery of the disk and the wall of this enlargement. Inward movement of the disk is checked by contact of the periphery of its inner face with the conical portion 11 but the grooves 28 permit air to pass freely between the inner face of the disk and this conical portion.

When the valve stem is released the pressure of the air from the interior of the inner tube moves the valve outward and as soon as the valve disk reaches the inner end of the cylindrical bore 13, flow of air past the disk is practically prevented and the full pressure of the air acts upon the valve disk to force it outward to carry the cylindrical portion 23 of the valve into the cylindrical portion 19 of the end plug and forces the gasket 27 against the valve seat 15.

The annular recess 25, in the outer face of the disk portion of the valve is so formed that a relatively thin annular wall 29 is left between the recess and the periphery of the disk so that the outer adge of the gasket 27 is protected against the action of the air and cannot be forced outward by air rushing past the valve disk. The gasket is thus held at all times in proper position to cooperate with the valve seat.

When air is forced inward to fill the inner tube of the tire the inward pressure of the air moves the valve inward, moving the cylindrical portion 23 out of the cylindrical bore 13 and moving the disk portion of the valve into the spherical enlargement 12 so that air may pass freely between the walls of this spherical piston and through the radial grooves 28, the gasket 27 being of course moved with the disk away from the valve seat 15.

Having thus described my invention, what I claim is:

1. In a valve for air tubes, a main tube having a bore of relatively small diameter extending from its inner end, a cylindrical bore of larger diameter extending inward from its outer end, an enlargement at the inner end of the cylindrical bore of larger diameter, a hollow plug extending into the cylindrical bore of larger diameter from its outer end, terminating a substantial distance from the outer end of the enlargement and having a valve seat at its inner end, and a cylindrical valve adapted to fit the cylindrical bore of larger diameter and of a length not less than the distance between the inner end of the hollow plug and the outer end of the enlargement and provided on its outer face with a gasket adapted to fit against the valve seat on the inner end of the hollow plug.

2. In a valve for air tubes, a main tube having a bore relatively small diameter extending from its inner end, a cylindrical bore of larger diameter extending inward from its outer end, an enlargement at the inner end of the cylindrical bore of larger diameter, a hollow plug extending into the cylindrical bore of larger diameter from its outer end, terminating a substantial distance from the outer end of the spherical enlargement and having a valve seat at its inner end, and a cylindrical valve adapted to fit the cylindrical bore of larger diameter and of a length not less than the distance between the inner end of the hollow plug and the outer end of the enlargement and provided on its outer face with a gasket adapted to fit against the valve seat on the inner end of the hollow plug, and also provided on its outer face with a cylindrical reduced portion adapted to fit the bore of the hollow plug and of a length not less than the distance between the inner end of the hollow plug and the outer end of the enlargement.

3. In a valve for air tubes, a main tube having a bore of relatively small diameter extending from its inner end, a cylindrical bore of larger diameter extending inward from its outer end, an enlargement at the inner end of the cylindrical bore of larger diameter, a hollow plug extending into the cylindrical bore of larger diameter from its outer end, terminating a substantial distance from the inter end of the enlargement and having a valve seat at its inner end, and a cylindrical valve disk adapted to fit the cylindrical bore of larger diameter and of a length not less than the distance between the inner end of the hollow plug and the outer end of the enlargement and provided on its outer face with a gasket adapted to fit against the valve seat on the inner end of the hollow plug, and also provided on its outer face with a cylindrical reduced portion adapted to fit the bore of the hollow plug and of a length not less than the distance between the inner end of the hollow plug and the outer end of the enlargement, said reduced portion being tapered above its cylindrical portion.

In testimony whereof I hereunto affix my signature.

GEORGE W. SHEELEY.